US012646158B2

(12) United States Patent
Kim et al.

(10) Patent No.: US 12,646,158 B2
(45) Date of Patent: Jun. 2, 2026

(54) DEVICE AND METHOD FOR DETECTING WILDFIRE

(71) Applicant: Alchera Inc., Seongnam-si (KR)

(72) Inventors: Jisu Kim, Seoul (KR); Youngseo Cha, Yongin-si (KR); Hee Chan Park, Ansan-si (KR); Yewon Jun, Seoul (KR); Minkook Cho, Seoul (KR)

(73) Assignee: ALCHERA INC., Seongnam-si (KR)

( * ) Notice: Subject to any disclaimer, the term of this patent is extended or adjusted under 35 U.S.C. 154(b) by 394 days.

(21) Appl. No.: 18/237,003

(22) Filed: Aug. 23, 2023

(65) Prior Publication Data

US 2024/0070832 A1 Feb. 29, 2024

(30) Foreign Application Priority Data

Aug. 24, 2022 (KR) ........................ 10-2022-0106304
Jul. 14, 2023 (KR) ........................ 10-2023-0091947

(51) Int. Cl.
 *G06T 7/73* (2017.01)
 *G06T 7/00* (2017.01)

(52) U.S. Cl.
 CPC .............. *G06T 7/0002* (2013.01); *G06T 7/73* (2017.01); *G06T 2207/20081* (2013.01)

(58) Field of Classification Search
 CPC ..................... G06T 7/0002; G06T 7/73; G06T 2207/20081; G06T 2207/10024;
(Continued)

(56) References Cited

U.S. PATENT DOCUMENTS

2021/0110691 A1* 4/2021 Heinonen ............ G08B 29/188

FOREIGN PATENT DOCUMENTS

CN 110992642 A * 4/2020 ............. G06N 3/045
CN 113570808 A * 10/2021 ........... H04N 23/661
(Continued)

OTHER PUBLICATIONS

Shifeng Zhang et al., "Bridging the Gap Between Anchor-based and Anchor-free Detection via Adaptive Training Sample Selection", 2020 IEEE/CVF Conference on Computer Vision and Pattern Recognition (CVPR), pp. 9759-9768, Date of Conference: Jun. 13-19, 2020.
(Continued)

*Primary Examiner* — Chan S Park
*Assistant Examiner* — Emily Rose Hauk
(74) *Attorney, Agent, or Firm* — LEX IP MEISTER, PLLC

(57) ABSTRACT
Provided are a device and a method for detecting a wildfire. The wildfire detecting device may include: an image data acquisition module acquiring image data captured by a shooting device; an image data storage module storing the image data acquired through the image data acquisition module in a storage space; a wildfire detection module performing wildfire detection by using a deformable convolution based deep learning model to which smoke characteristics widely diffused are reflected by dynamically adjusting a filter position by using a learnable offset from the image data; and a wildfire direction and position estimation module estimating a direction and a position of the wildfire with respect to a case where it is determined that the wildfire occurs by the wildfire detection module.

13 Claims, 13 Drawing Sheets

(58) Field of Classification Search
    CPC . G06T 2207/10048; G06T 2207/20084; G06T
             2207/30181; G06T 2207/30232; G06V
                10/764; G06V 10/774; G06V 10/778;
                       G06V 10/82; G06V 20/52
    See application file for complete search history.

(56) References Cited

FOREIGN PATENT DOCUMENTS

| | | | | | |
|---|---|---|---|---|---|
| CN | 114092458 | A | * | 2/2022 | ............. G06N 3/045 |
| CN | 114821414 | A | * | 7/2022 | ............. G06F 18/25 |
| CN | 114898140 | A | * | 8/2022 | ............. G06N 3/045 |
| KR | 10-2144974 | | | 8/2020 | |
| KR | 10-2427634 | | | 8/2022 | |

OTHER PUBLICATIONS

So-Yeol Lee et al., "Road Object Detection and Traffic Light, Sign Recognition Network Using Refine Det and Deformable Convolution", Proceedings of the 2020 Korea Institute of Electrical Engineers Summer Conference, Aug. 2020, pp. 2041-2044, Only abstract in English.

* cited by examiner

Figure 2:
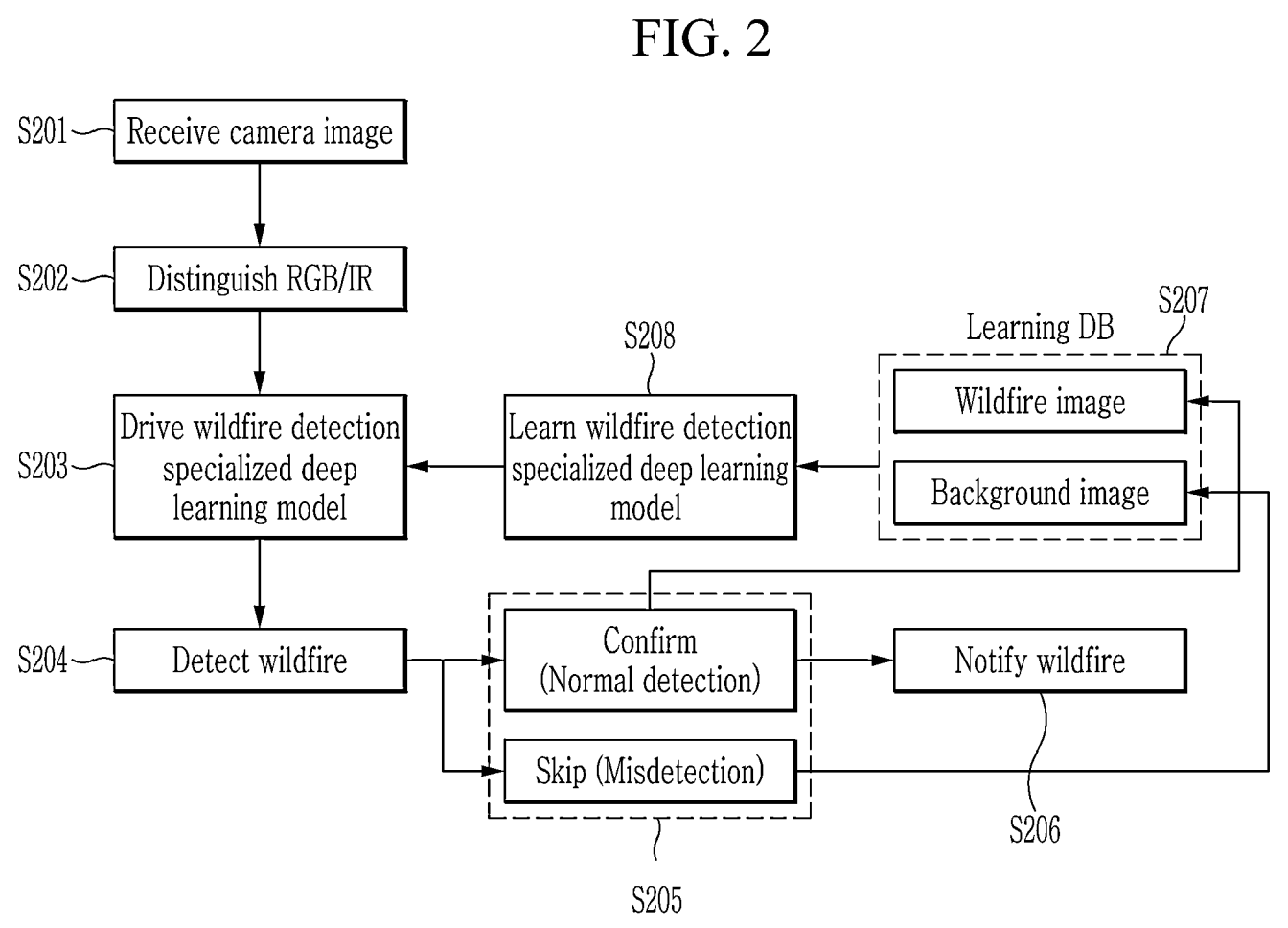

```
S201 ── Receive camera image
              │
              ▼
S202 ── Distinguish RGB/IR
              │
              ▼
S203 ── Drive wildfire detection
        specialized deep
        learning model
              │
              ▼
S204 ── Detect wildfire
```

Learning DB — S207
- Wildfire image
- Background image

S208 — Learn wildfire detection specialized deep learning model

S205
- Confirm (Normal detection)
- Skip (Misdetection)

S206 — Notify wildfire

FIG. 3

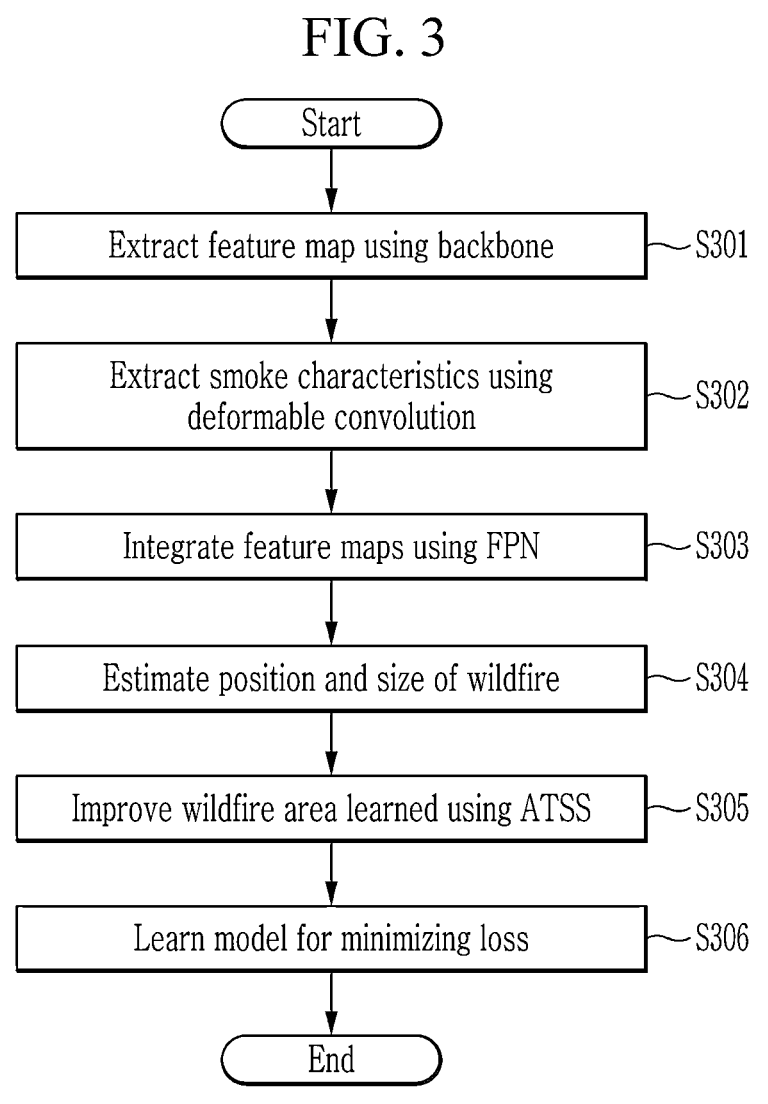

Start

Extract feature map using backbone ～S301

Extract smoke characteristics using deformable convolution ～S302

Integrate feature maps using FPN ～S303

Estimate position and size of wildfire ～S304

Improve wildfire area learned using ATSS ～S305

Learn model for minimizing loss ～S306

End

FIG. 13

DEVICE AND METHOD FOR DETECTING WILDFIRE

CROSS-REFERENCE TO RELATED APPLICATION

This application claims priority to and the benefit of Korean Patent Application No. 10-2022-0106304 filed in the Korean Intellectual Property Office on Aug. 24, 2022, and Korean Patent Application No. 10-2023-0091947 filed in the Korean Intellectual Property Office on Jul. 14, 2023, the entire contents of which are incorporated herein by reference.

BACKGROUND

(a) Technical Field

The present disclosure relates to a device and a method for detecting a wildfire.

(b) Description of the Related Art

Wildfire detection technology is technology that rapidly detects and predicts occurrence and spread of wildfire. The wildfire detection technology can be based on satellite image data, remote detection data, weather data, and terrain and vegetation data. For example, satellites that observe the earth can capture large wildfire in real time, accurately track a position and a size of the fire, and detect and track a position and a diffusion speed of the wildfire by analyzing satellite image data. As another example, various remote detection technologies including infrared sensors, near infrared sensors, radars, etc., are used for wildfire detection, and the sensors provide remote detection data including information such as temperature, humidity, soil moisture, etc., to evaluate a fire risk and predict a wildfire possibility therefrom. As yet another example, by using weather data including information such as temperature, humidity, wind speed, precipitation, etc., which affect the occurrence and diffusion of the wildfire, a high-risk region can be identified, and a weather condition which can affect the occurrence and a progress of the fire can be analyzed. As still yet another example, the risk region can be also analyzed and a diffusion path of the wildfire can also be predicted by using the terrain and vegetation data.

SUMMARY

The present disclosure has been made in an effort to provide a device and a method for detecting a wildfire, which can detect an initial wildfire based on deep learning from an image captured by a shooting device and express the initial wildfire by a bounding box.

An example embodiment of the present disclosure provides a device for detecting a wildfire, which include: an image data acquisition module acquiring image data captured by a shooting device; an image data storage module storing the image data acquired through the image data acquisition module in a storage space; a wildfire detection module performing wildfire detection by using a deformable convolution based deep learning model to which smoke characteristics widely diffused are reflected by dynamically adjusting a filter position by using a learnable offset from the image data; and a wildfire direction and position estimation module estimating a direction and a position of the wildfire with respect to a case where it is determined that the wildfire occurs by the wildfire detection module.

In some example embodiments, the wildfire detection module may improve a wildfire area learned by the deep learning model by using adaptive training sample selection (ATSS).

In some example embodiments, the wildfire detection module may regard sample points arrayed inside a ground truth (GT) given as a bounding box on an image as a candidate group for the positive sample, compute a score for each sample point, and classify a sample point in which the computed score is equal to or more than a predetermined threshold into a positive sample.

In some example embodiments, the wildfire detection module may classify a sample point in which the computed score does not reach the predetermined threshold into an ignore sample.

In some example embodiments, the score may be computed as intersection over union (IoU).

In some example embodiments, the score may be computed as a product of the intersection over union (IoU) and a confidence of the deep learning model.

In some example embodiments, the device for detecting a wildfire may further include an application programming interface (API) providing module providing an interface for enabling a user having an authority to easily use result data of performing wildfire detection and result of data of estimating the direction and the position of the wildfire.

Another example embodiment of the present disclosure provides a method for detecting a wildfire, which may include: acquiring image data captured by a shooting device; performing wildfire detection by using a deformable convolution based deep learning model to which smoke characteristics widely diffused are reflected by dynamically adjusting a filter position by using a learnable offset from the image data; and estimating a direction and a position of the wildfire with respect to a case where it is determined that the wildfire occurs according to a wildfire direction result.

In some example embodiments, the performing of the wildfire detection may include improving a wildfire area learned by the deep learning model by using adaptive training sample selection (ATSS).

In some example embodiments, the performing of the wildfire detection may include regarding sample points arrayed inside a ground truth (GT) given as a bounding box on an image as a candidate group for the positive sample, computing a score for each sample point, and classifying a sample point in which the computed score is equal to or more than a predetermined threshold into a positive sample.

In some example embodiments, the performing of the wildfire detection may further include classifying a sample point in which the computed score does not reach the predetermined threshold into an ignore sample.

In some example embodiments, the score may be computed as intersection over union (IoU).

In some example embodiments, the score may be computed as a product of the intersection over union (IoU) and a confidence of the deep learning model.

In some example embodiments, the method may further include providing an interface for enabling a user having an authority to easily use result data of performing wildfire detection and result of data of estimating the direction and the position of the wildfire.

Yet another example embodiment of the present disclosure provides a computer-readable medium having a program for executing the following steps, which is recorded therein, in a computer including a processor executing a program or an instruction stored in a memory or a storage device, in which the steps may include: acquiring image data captured by a shooting device; performing wildfire detection by using a deformable convolution based deep learning model to which smoke characteristics widely diffused are reflected by dynamically adjusting a filter position by using a learnable offset from the image data; and estimating a direction and a position of the wildfire with respect to a case where it is determined that the wildfire occurs according to a wildfire detection result.

BRIEF DESCRIPTION OF THE DRAWINGS

FIG. 1 is a block diagram for describing a wildfire detection system according to an example embodiment.

FIG. 2 is a flowchart for describing a wildfire detection method according to an example embodiment.

FIG. 3 is a flowchart for describing a wildfire detection method according to an example embodiment.

FIG. 13 is a diagram for describing a computing device according to an example embodiment.

DETAILED DESCRIPTION OF THE EMBODIMENTS

Figure 4:
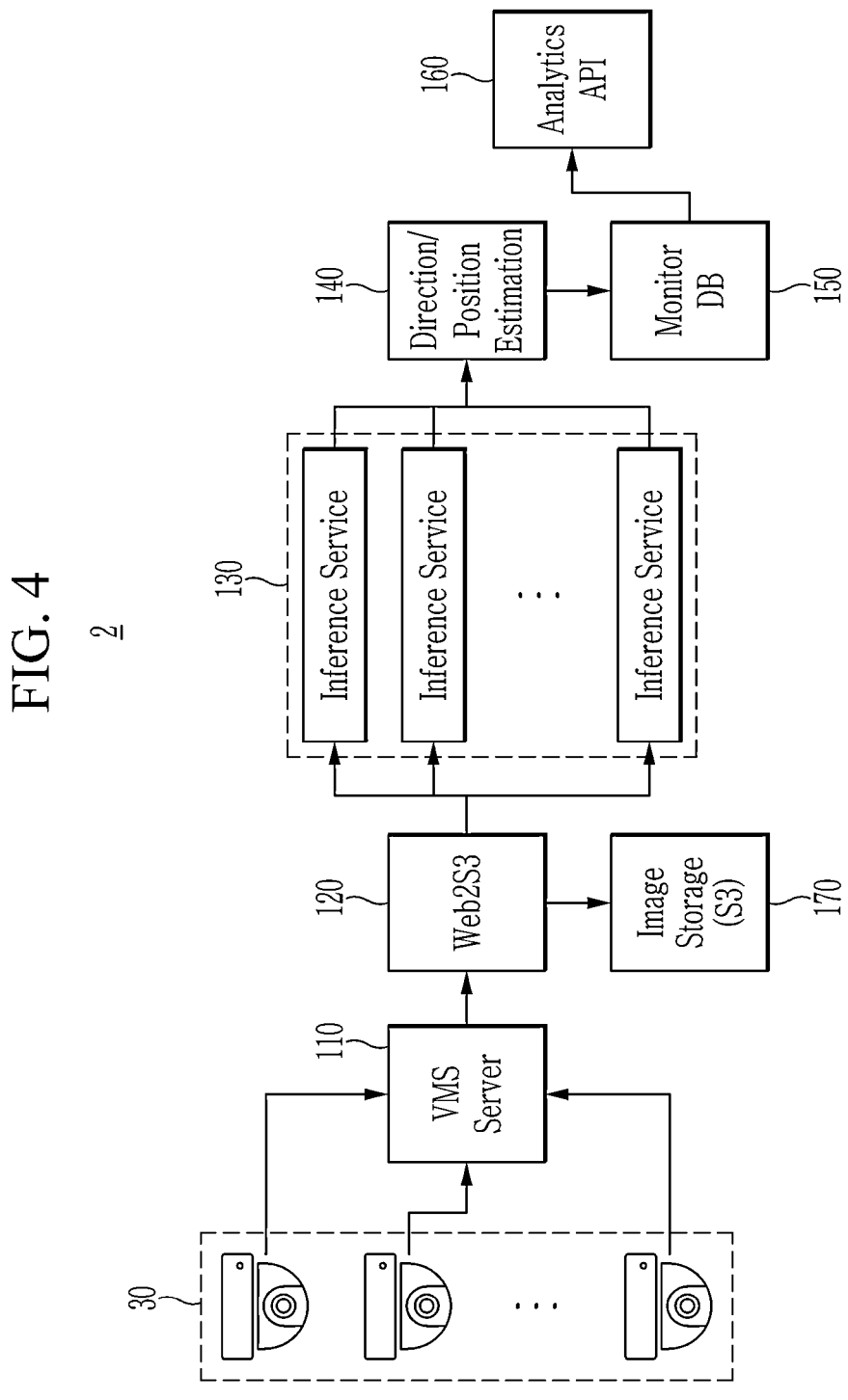
FIG. 4 is a diagram illustrating one implementation example of a wildfire detection system according to an example embodiment.

In the following detailed description, only certain example embodiments of the present invention have been shown and described, simply by way of illustration. However, the present invention can be variously implemented and is not limited to the following example embodiments. Accordingly, the drawings and description are to be regarded as illustrative in nature and not restrictive. Like reference numerals designate like elements throughout the specification.

Throughout the specification and claims, unless explicitly described to the contrary, the word "comprise", and variations such as "comprises" or "comprising", will be understood to imply the inclusion of stated elements but not the exclusion of any other elements. Terms including an ordinary number, such as first and second, are used for describing various constituent elements, but the constituent elements are not limited by the terms. The terms are used only to discriminate one constituent element from another constituent element.

In addition, terms including "part", "er", "module", and the like disclosed in the specification mean a unit that processes at least one function or operation described in this specification and this may be implemented by hardware or a circuit, or software or a combination of hardware or the circuit and software.

When a wildfire occurs, casualties and property damage in a surrounding area may occur, and may be seriously affected by forests, wildfire habits, and soils. In addition, as the wildfire spreads, manpower, equipment, and time needed for suppression may be increased. Therefore, an importance of an initial response to the wildfire is high, and an appropriate initial response may minimize the casualties and property damage, and reduce the cost of the suppression by limiting the scale of the fire. Further, when the wildfire is rapidly suppressed due to the initial response, a recovery of a community and an environment may be faster. It is necessary to detect the wildfire early for the initial response.

Figure 1:
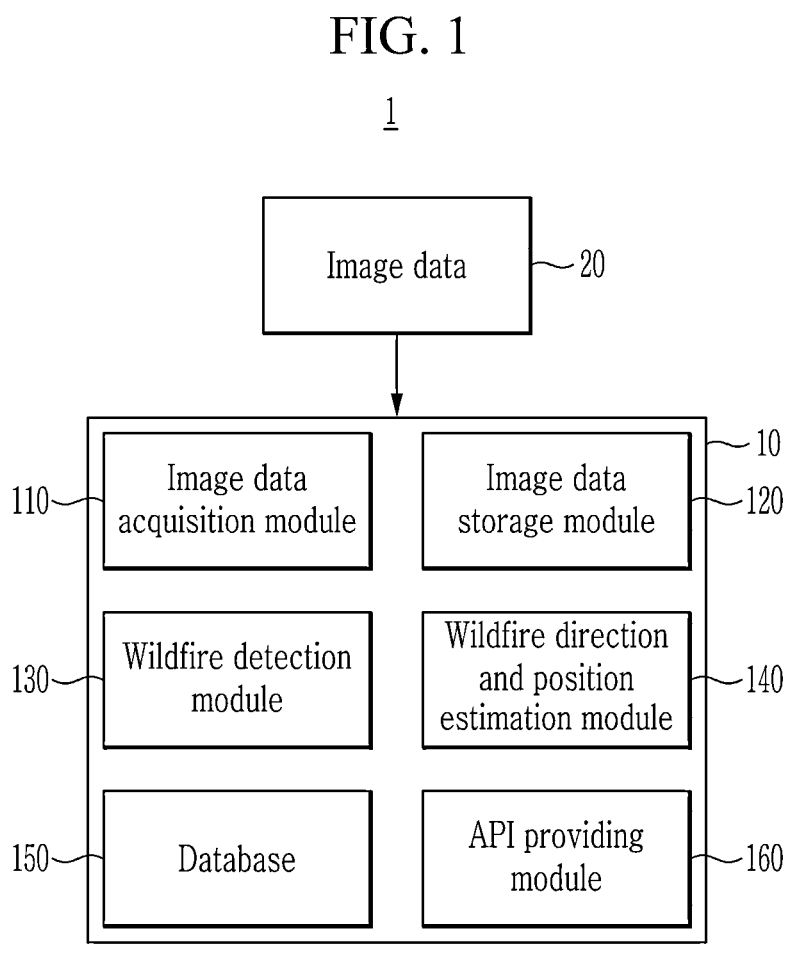

FIG. 1 is a block diagram for describing a wildfire detection system according to an example embodiment.

In the case of an initial wildfire, the wildfire starts with weak smoke, so there may be many elements which will make the initial wildfire be misrecognized as a wildfire such as fog, clouds, sand breezes and intermittent streams. In particular, the clouds and the fogs appear in a very similar form to the initial wildfire, so it is difficult to distinguish from the actual initial wildfire. In addition, in the case of the initial wildfire, an area shown in a captured image taken is very small, and the detection of the initial wildfire is required in a very small area. Referring to FIG. 1, the wildfire detection system 1 according to an example embodiment may include a wildfire detection device 10 that detects the initial wildfire by using a deep learning model designed to distinguish the initial wildfire from the clouds and the fogs with high accuracy from image data 20 captured by a shooting device, and expresses the detected initial wildfire by a bounding box.

The wildfire detection device 10 may include an image data acquisition module 110, an image data storage module 120, a wildfire detection module 130, a wildfire direction and position estimation module 140, a database 150, and an application programming interface (API) providing module 160.

The image data acquisition module 110 may acquire the image data 20 captured by the shooting device. In some example embodiments, the shooting device may include at least one of a digital video recorder (DVR), a network video recorder (NVR), and an IP camera. The DVR may process video data in a recorder, and the NVR may encode and process the video data in a camera, and then stream the encoded and processed video data to the NVR recorder used for storage and remote view. In some example embodiments, the NVR may be used jointly with an IP camera, and the DVR may be used jointly with an analog camera. The image data acquisition module 110 may acquire the image data 20 from the shooting device through a predetermined streaming protocol. Here, the image data 20 may include raw image data and meta data.

The image data storage module 120 may store the image data 20 acquired through the image data acquisition module 110 in a storage space. Here, the storage space may be a storage space implemented as a cloud, i.e., a cloud storage. In some example embodiments, the image data storage module 120 may store the image data 20 according to a predetermined period, and change the predetermined period as necessary.

The wildfire detection module 130 may perform wildfire detection from the image data 20 by using the deep learning model. The wildfire detecting module 130 may be implemented as a plurality of services that performs the wildfire detection. For example, the plurality of services may include first to third services, and each service may perform the wildfire detection from the image data 20 collected from 150 to 200 shooting devices, for example.

The image data 20 may also be a red, green, blue (RGB) image, or an infrared (IR) image. The wildfire detection module 130 may recognize a format of the image data 20, select a deep learning model learned with the RGB image when the format is the RGB image and select a deep learning model learned with the IR image when the format is the IR image.

The wildfire detection module 130 may extract a feature map by using a backbone which is a basic structure which serves to extract a feature in the deep learning model. For example, in a convolutional neural network (CNN), the backbone may include a plurality of convolutional layers for extracting the feature from an input image, and the extracted feature may be acquired as the feature map. In some example embodiments, the wildfire detection module 130 may resize the image data 20 to an appropriate size, and perform normalization for the image data 20. The image data 20 may pass through multiple layers (e.g., convolutional layers) of the deep learning model (e.g., CNN model), and in each layer, various levels of abstractions may be performed while maintaining spatial information of the image data 20. For example, in an initial layer of the deep learning model, low-level features such as a corner, a texture, etc., may be extracted from an image which is subject to fire detection, and in a subsequent layer, object parts such as smoke, clouds, fog, etc., or high-level features such as a complicated pattern may be extracted. A feature map generated from a final layer of the deep learning model may include various spatial information and extracted features, and converted into a desired size and a desired form through a computation such as pooling or upsampling as necessary.

In particular, the wildfire detection module 130 may train a deformable convolution based deep learning model reflecting widely diffused smoke characteristics to suit the smoke feature by using a deformable convolution computation that deforms a general convolution computation to be adapted to a local deformation or displacement of an image while dynamically adjusting a position of a convolution filter without fixing the position of the convolution filter. Since the general convolution computation is performed while a filter moves on a fixed grid, it is difficult to cope with a form or position change of an object, but in the case of deformable convolution, the filter position is dynamically adjusted by using a learnable offset, the model may be adapted to deformation, rotation, scaling, etc., of the image, and with respect to widely diffused smokes by adapting to the local deformation or displacement of the image, the convolution computation may be performed with respect to a wide area as large. As a result, accuracy and performance of smoke detection may be enhanced.

The wildfire detection module 130 may integrate various scales of feature maps by using a feature pyramid network (FPN). Specifically, the FPN may extract feature maps having various sizes from multiple layers of the deep learning model which the wildfire detection module 130 uses for wildfire detection, each layer may include various levels of spatial information and extracted features for the image, and detect objects such as smokes, clouds, fogs, etc., having different scales through the spatial information and extracted features. The FPN upsamples respective feature maps to make the feature maps in the same size, and adds the feature maps having the same size to generate an integrated feature map. The integrated feature map may include various scales of feature information. As a result, since various sizes of feature maps may be integrated in the wildfire detection, the objects such as smokes, clouds, fogs, etc., having various scales may be effectively detected.

The wildfire detection module 130 may predict a wildfire probability and a wildfire scale (size) according to a pixel position of the image based on the finally acquired feature map. Only when a value of the predicted wildfire probability is equal to or more than a predetermined value, it may be finally determined that the wildfire occurs. The wildfire scale may be predicted based on the position of the pixel determined to correspond to the wildfire on the image.

The wildfire direction and position estimation module 140 may estimate the direction and the position of the wildfire with respect to a case where it is determined that the wildfire occurs by wildfire detection module 130. Here, the position may be represented as latitude and longitude. The wildfire direction and position estimation module 140 may estimate the direction and the position of the wildfire based on image coordinates corresponding to the wildfire position detected from raw image data of the image data 20, and meta data.

The database 150 may store and manage result of data of performing the wildfire detection by the wildfire detection module 130, result data of estimating the direction and the position of the wildfire by the wildfire direction and position estimation module 140, etc. In some example embodiments, the database 150 may adopt a relational database that structuralizes data by using a table of which each unique schema is determined, a not only SQL (NoSQL) database using a data model in which the schema is not fixed, an object-oriented database that stores and manages data by using a concept of an object-oriented programming language, etc.

The application programming interface (API) providing module 160 may provide an interface which enables a user having an authority to easily use the result data of performing the wildfire detection and the result data of estimating the direction and the position of the wildfire while controlling an access of the user through user authentication and authority management with respect to the data stored in the database 150.

In some example embodiments, the wildfire detection module 130 may improve the wildfire area learned by the deep learning model by using adaptive training sample selection (ATSS). Specifically, the wildfire detection module 130 selects specific samples in a deep learning model learning process to enhance efficiency and accuracy of learning, and in particular, cope with unbalance or noise in a dataset. To this end, the wildfire detection module 130 may use a positive sample, a negative sample, and an ignore sample.

The positive sample may be a sample having a right label, which helps model learning, and may play an important role in achieving a goal learned by the mode, and contribute to improve the performance of the model. Meanwhile, the negative sample as a sample having an inaccurate label or information which is not related, which does not help the model learning may interfere with the learning of the model or inhibit a generalization ability. The ignore sample as an ignorable sample which does not influence the model learning may have background noise, incomplete data, or an ambiguous label.

The wildfire detection module 130 may regard sample points arrayed inside a ground truth (GT) given as the bounding box on the image as a candidate group for the positive sample. The wildfire detecting module 130 effectively selects the positive sample from the candidate group to enhance wildfire detection performance. Specifically, the wildfire detection module 130 may compute a score for each sample point, and classify the sample point into the positive sample when the computed score is equal to or more than a predetermined threshold.

When the computed score does not reach the predetermined threshold, the wildfire detection module 130 may classify the sample point into not the negative sample but the ignore sample. In early wildfire detection, an area corresponding to cloudy smoke needs to be treated as a sample to help the model learning. However, when the sample point where the computed score does not reach the predetermined threshold is classified into the negative sample, the sample point as a sample indicating that the area corresponding to the cloudy smoke does not correspond to the wildfire may be used for the model learning, so early wildfire detection accuracy of the learned deep learning model may be deteriorated. In order to solve such a problem, the wildfire detection module 130 treats the area corresponding to the cloudy smoke as the ignore sample not to be reflected on the learning of the deep learning model to enhance the early wildfire detection accuracy of the learned deep learning model.

In some example embodiments, when the score is equal to or more than a first value, the sample point may be classified into the positive sample, when the score is less than the first value and equal to or more than a second value, the sample point may be classified into the ignore sample, and when the score is less than a second value, the sample point may be classified into the negative sample. Here, the first value and the second value may be values experimentally determined by considering environmental elements through which the wildfire detection is made.

In some example embodiments, the score may be computed as intersection over union (IoU). The IoU as a metric for measuring how two areas overlap with each other may represent a degree at which the bounding box corresponding to the GT and a bounding box corresponding to the wildfire detection area predicted from the deep learning model used by the wildfire detection module 130 overlap with each other.

In some example embodiments, in order to express a reliability for the positive sample, the score may be computed by a product of the IoU and a confidence of the deep learning model. Here, the confidence as a value indicating the reliability for the prediction of the deep learning model may be expressed as, for example, a probability value between 0 and 1, and indicate that the model is more confident with a prediction result as the value is the larger. As the score is defined as the product of the IoU and the confidence, a score of a more reliable sample may be derived.

In some example embodiments, the predetermined threshold may be determined based on an average and a standard deviation of score values computed for all sample points on the image.

The wildfire detection module 130 may define a loss function based on the improved learning area, and perform the learning of the deep learning model in a direction to minimize loss.

FIG. 2 is a flowchart for describing a wildfire detection method according to an example embodiment.

Referring to FIG. 2, in the wildfire detecting method according to an example embodiment, a camera image captured by the shooting device installed at an outdoor site may be received (S201). In some example embodiments, the shooting device, i.e., a camera separately adopts an IR filter, so the shooting device receives the RGB image at normal times, but when it becomes dark at night, the shooting device may receive the IR image converted through the filter. Since it may not be separately known whether the format of the received image is the RGB or the IR, values of received image pixels are compared to distinguish the format (S202).

Thereafter, a wildfire detection specialized deep learning model that fits a distinguished image environment may be driven, and the image may be input into the deep learning model (S203). When the previously learned deep learning model is operated, the position and the size of the wildfire may be output and stored in the form of the bounding box in the image (S204). When an output result corresponds to an actual wildfire, the output result may be classified into normal detection, otherwise the output result may be classified into misdetection (S205), and the result classified into the normal detection may be used for wildfire notification (S206).

An image classified into the normal detection and an image classified into the misdetection may be added to a learning database (S207). In some example embodiments, in the case of the image classified into the normal detection, a detection result of the model as a normal wildfire image may be used as the GT as it is, and in the case of the image classified into the misdetection, the corresponding image may be used as a background image. The deep learning model learns a learning database to which a new image is added to update the learning model at a predetermined period, and the updated learning model may be applied to an actual environment again.

FIG. 3 is a flowchart for describing a wildfire detection method according to an example embodiment.

Referring to FIG. 3, the wildfire detection method according to an example embodiment may include acquiring image data 20 captured by a shooting device; performing wildfire detection by using a deformable convolution based deep learning model to which smoke characteristics diffused widely are reflected by dynamically adjusting a filter position by using a learnable offset from the image data 20; and estimating a direction and a position of a wildfire with respect to a case where it is determined that the wildfire occurs according to a wildfire detection result.

The performing of the wildfire detection may include extracting a feature map by using a backbone (S301), extracting the smoke characteristics by using a deformable convolution (S302), integrating the feature map by using an FPN (S303), estimating a position and a size of a wildfire learned by using ATSS (S304), improving a learned wildfire area by using ATSS (S305), and training a model for minimizing loss (S306).

For detailed contents for the wildfire detection method in FIGS. 2 and 3, descriptions of FIG. 1 and FIGS. 4 to 12 may be referenced, so a duplicated description will be omitted.

FIG. 4 is a diagram illustrating one implementation example of a wildfire detection system according to an example embodiment.

Referring to FIG. 4, the wildfire detection system 2 according to an example embodiment may include a VMS server, Web2S23, a plurality of inference services, a direction/position estimation unit, a monitoring database, an analysis API, and a plurality of cameras, which may correspond to the image data acquisition module 110, the image data storage module 120, the wildfire detection module 130, the wildfire direction and position estimation module 140, the database 150, the API providing module 160, and the shooting device 30 of FIG. 1, respectively.

FIGS. 5 to 12 are diagrams illustrating example screens related to the device and the method for detecting a wildfire according to the example embodiments.

Figure 5:
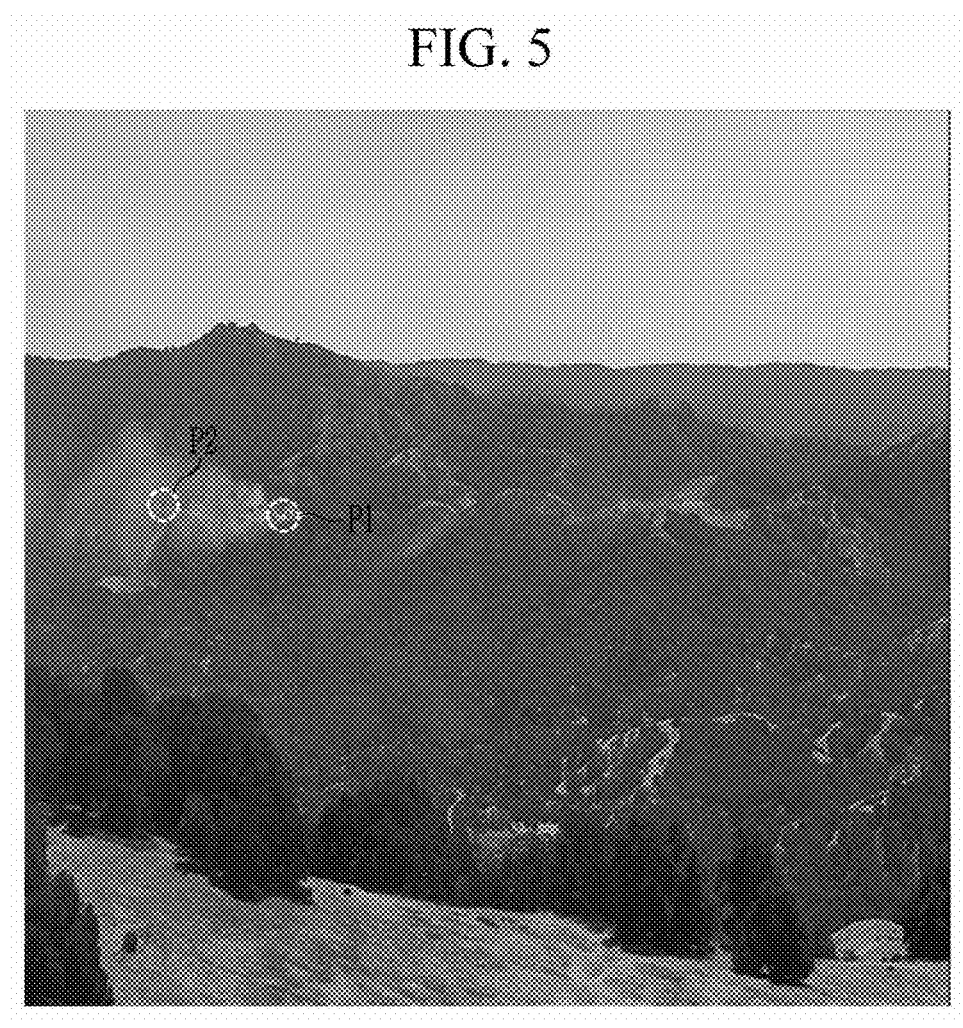
FIGS. 5 to 12 are diagrams illustrating example screens related to the device and the method for detecting a wildfire according to the example embodiments.

Referring to FIG. 5, the wildfire detection module 130 may train a deformable convolution based deep learning model reflecting a widely diffused smoke feature to suit the smoke feature by using a deformable convolution computation that deforms a general convolution computation to be adapted to a local deformation or displacement of an image while dynamically adjusting a position of a convolution filter without fixing the position of the convolution filter, and P1 represents a reference position and P2 represents a learned position according to the deformable convolutional computation. As illustrated, it may be known that the learned points P2 are gathered in a smoke area around the reference position P1, and in this case, the computation is performed in specialization to the smoke, so it may be known that the accuracy of the smoke detection is enhanced compared to a general convolution scheme.

The wildfire detection module 130 may improve the wildfire area learned by the deep learning model by using the adaptive training sample selection (ATS S).

Figure 6:
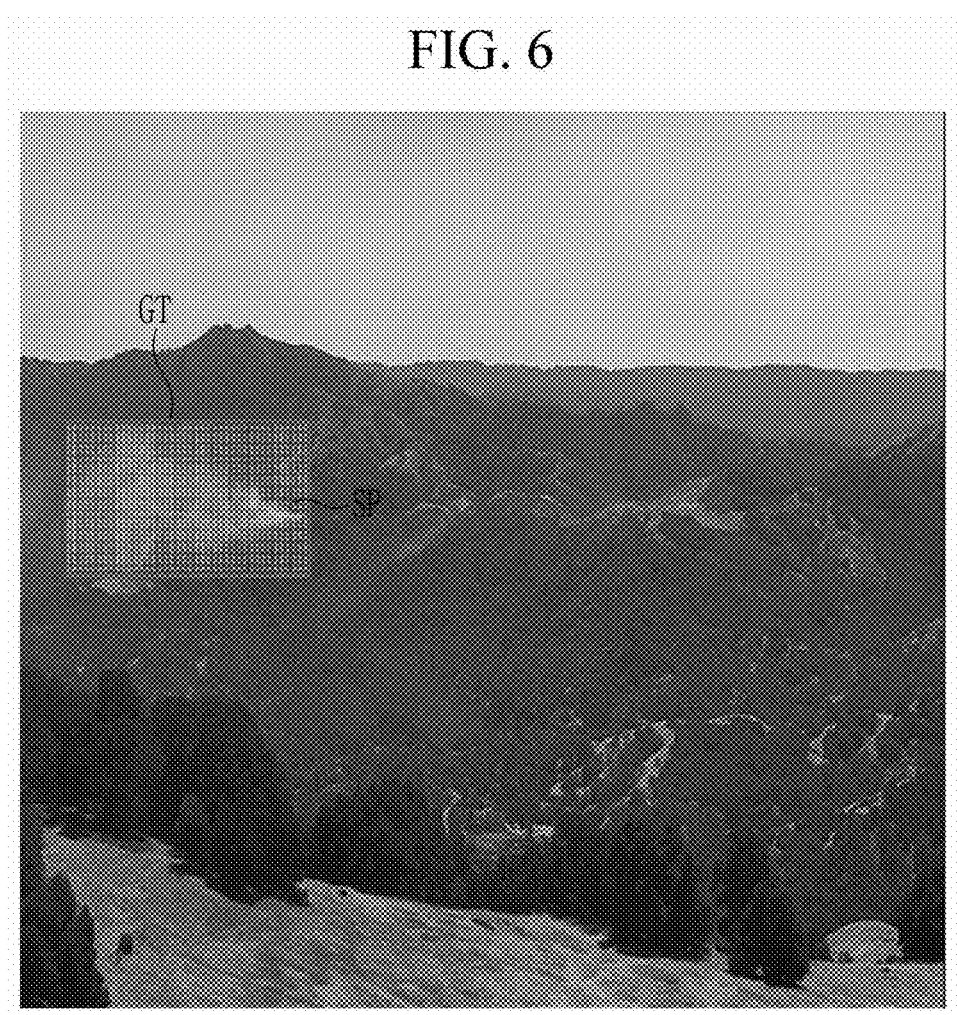

Referring to FIG. 6, the ground truth (GT) may be given as the bounding box on the image, and sample points SP may be arrayed therein. The sample points SP may be regarded as the candidate group for the positive sample.

Figure 7:
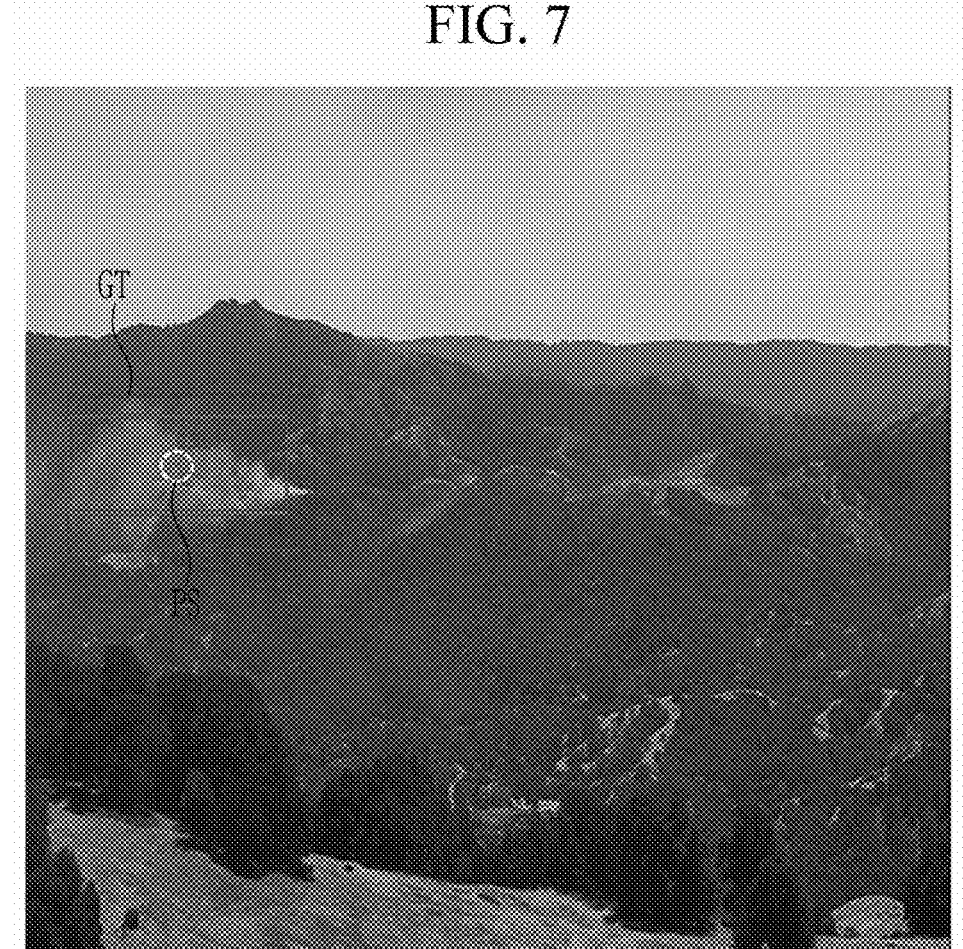
Figure 8:
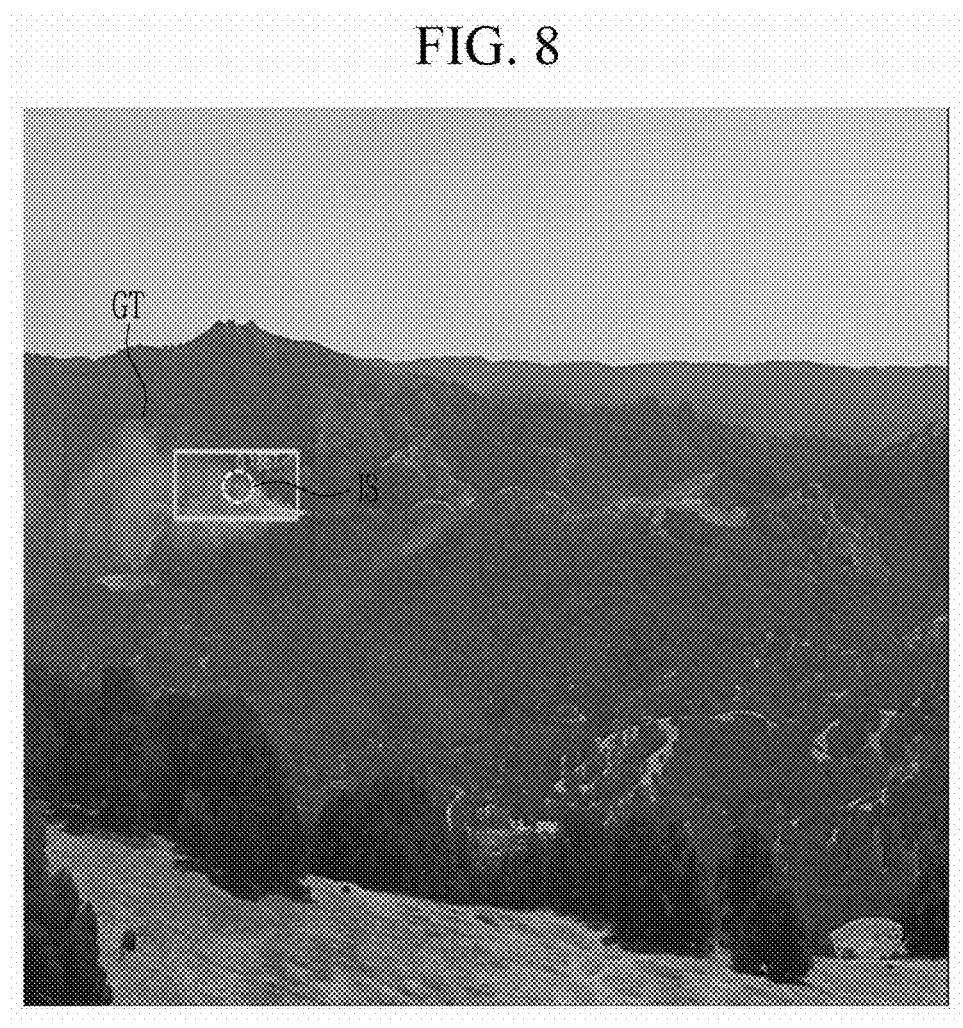

Referring to FIG. 7, a prediction result according to the positive sample PS is represented, and 0.5036 is displayed as a score of the prediction result, and referring to FIG. 8, a prediction result according to the ignore sample IS is represented, and 0.1867 is displayed as a score of the prediction result.

Figure 9:
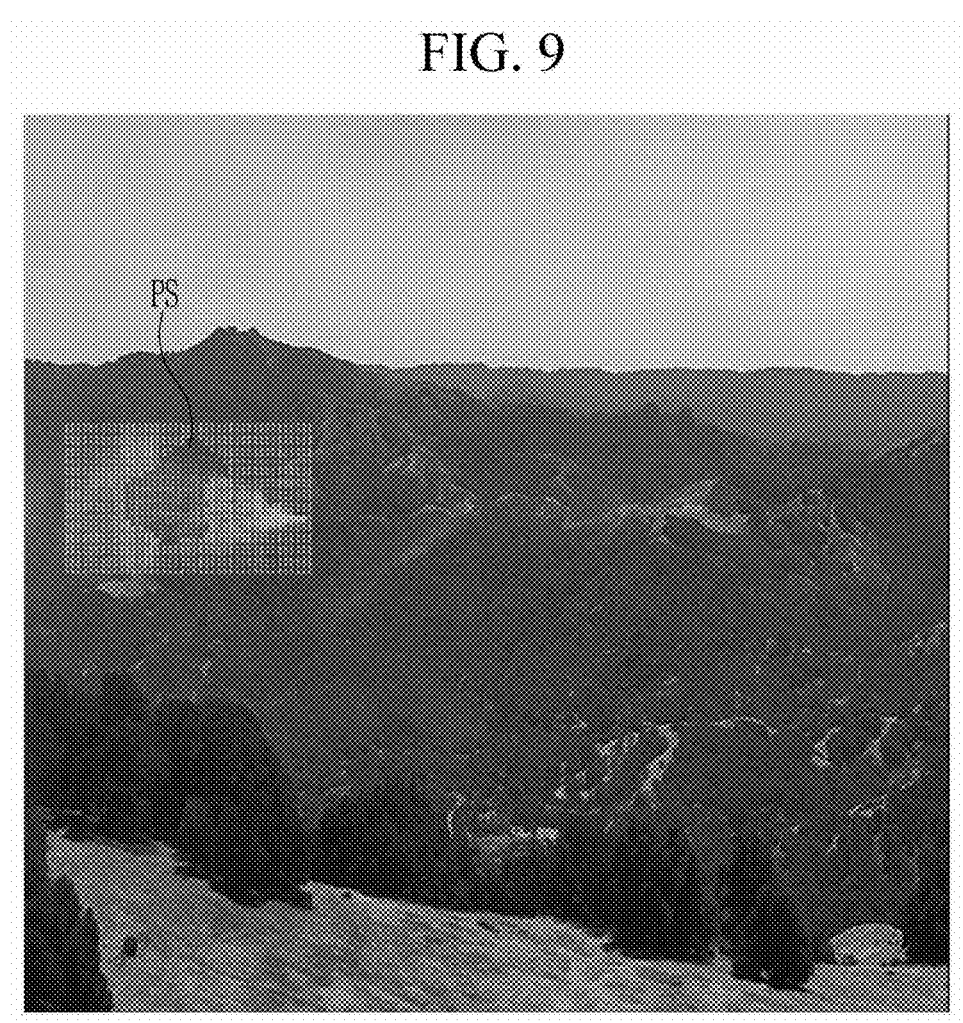
Figure 10:
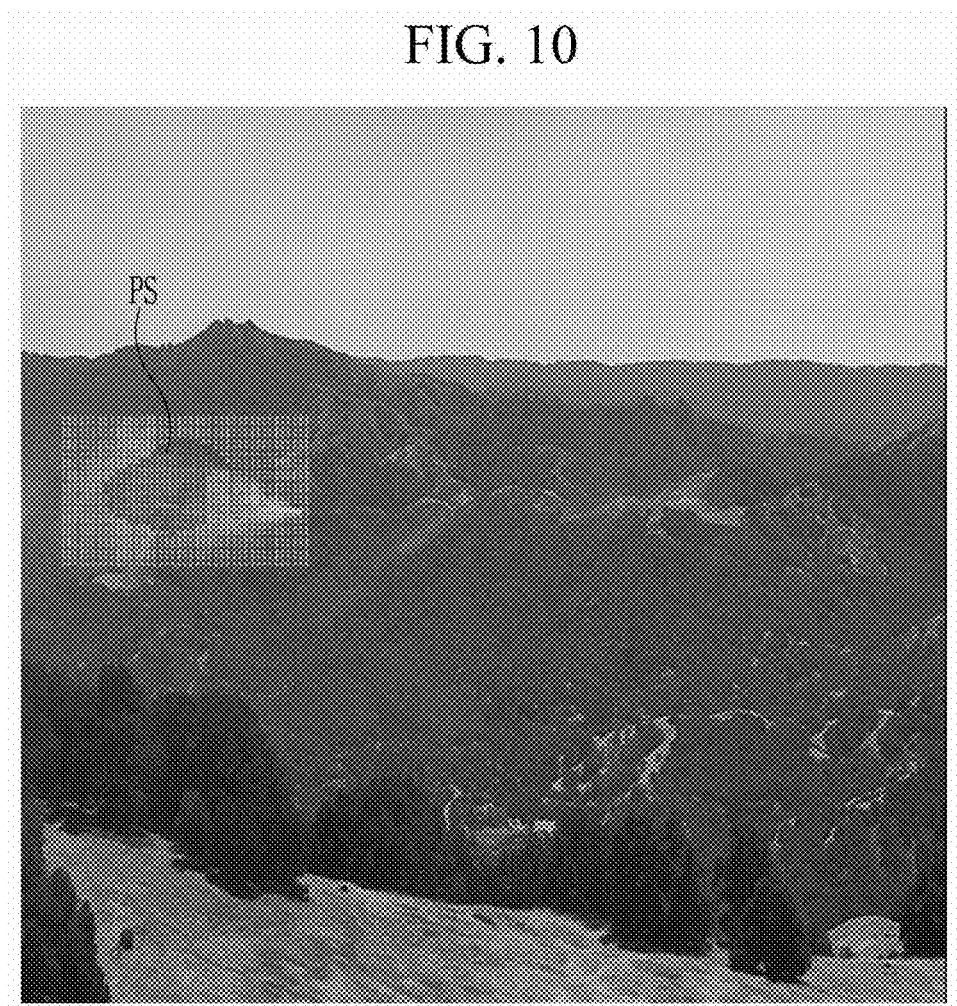

FIG. 9 illustrates a result of a scheme of classifying the sample point in which the conventionally computed score does not reach the predetermined threshold into the negative sample, and FIG. 10 illustrates a result of a scheme of classifying the sample point in which the conventionally computed score does not reach the predetermined threshold into the ignore sample according the example embodiment. It may be confirmed that the positive sample PS of the result of FIG. 10 includes more smoke areas than FIG. 9, and it may be known that early wildfire detection accuracy is increased therefrom.

Figure 11:
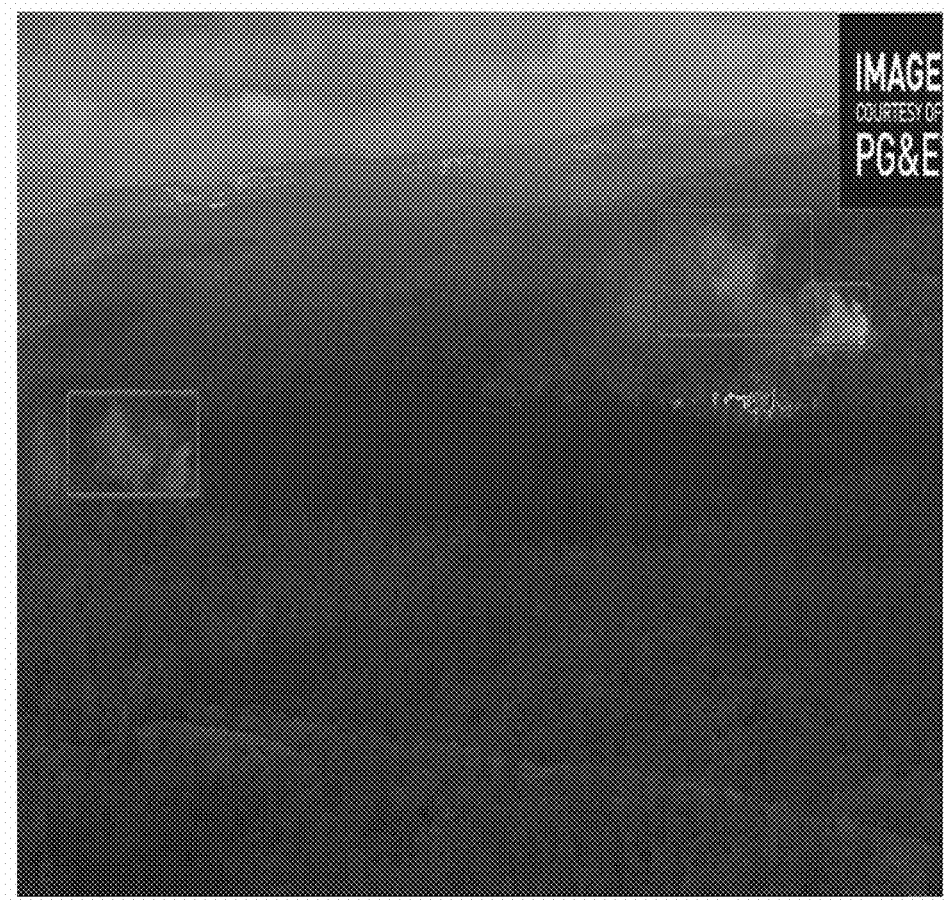
Figure 12:
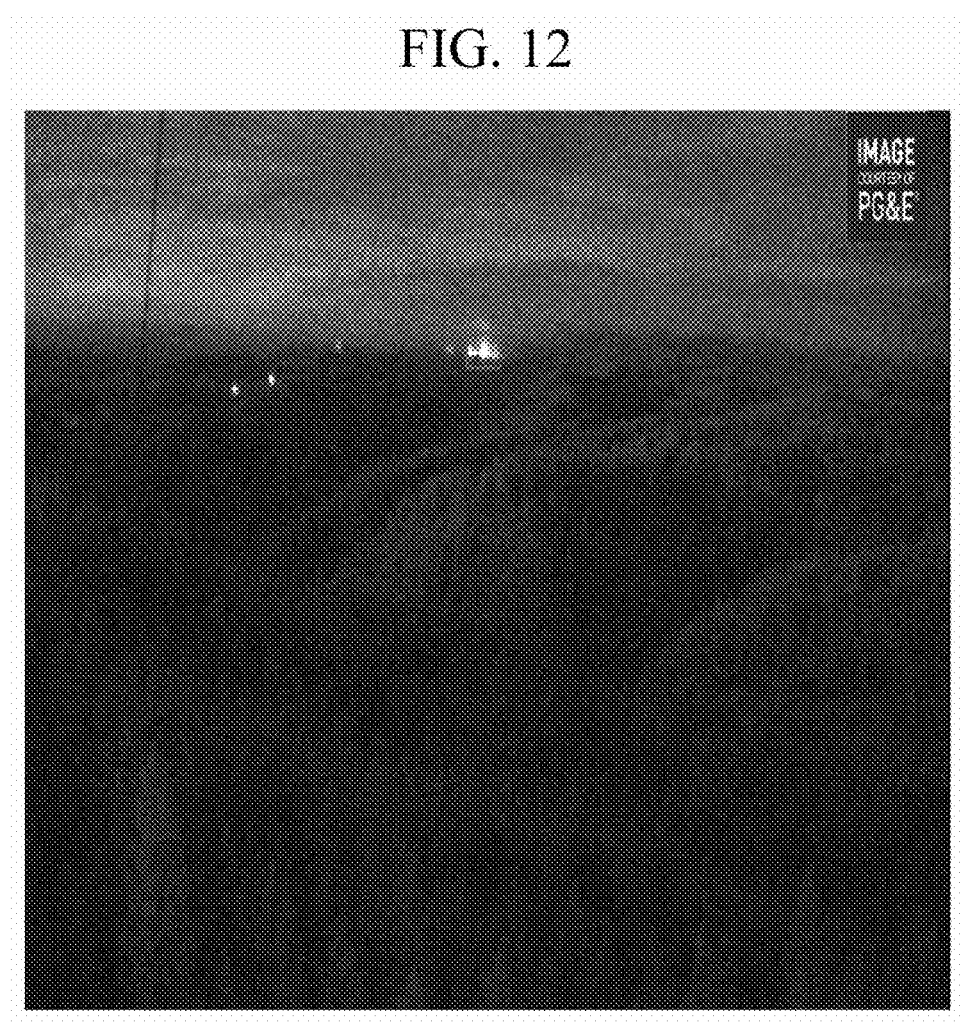

FIG. 11 illustrates a wildfire result which an algorithm finally detects with respect to the RGB image and FIG. 12 illustrates a wildfire result in which the algorithm finally detects with respect to the IR image. As illustrated, it is possible to detect a small wildfire smoke, and it is also possible to sense the wildfire with respect to the IR image.

Figure 13:
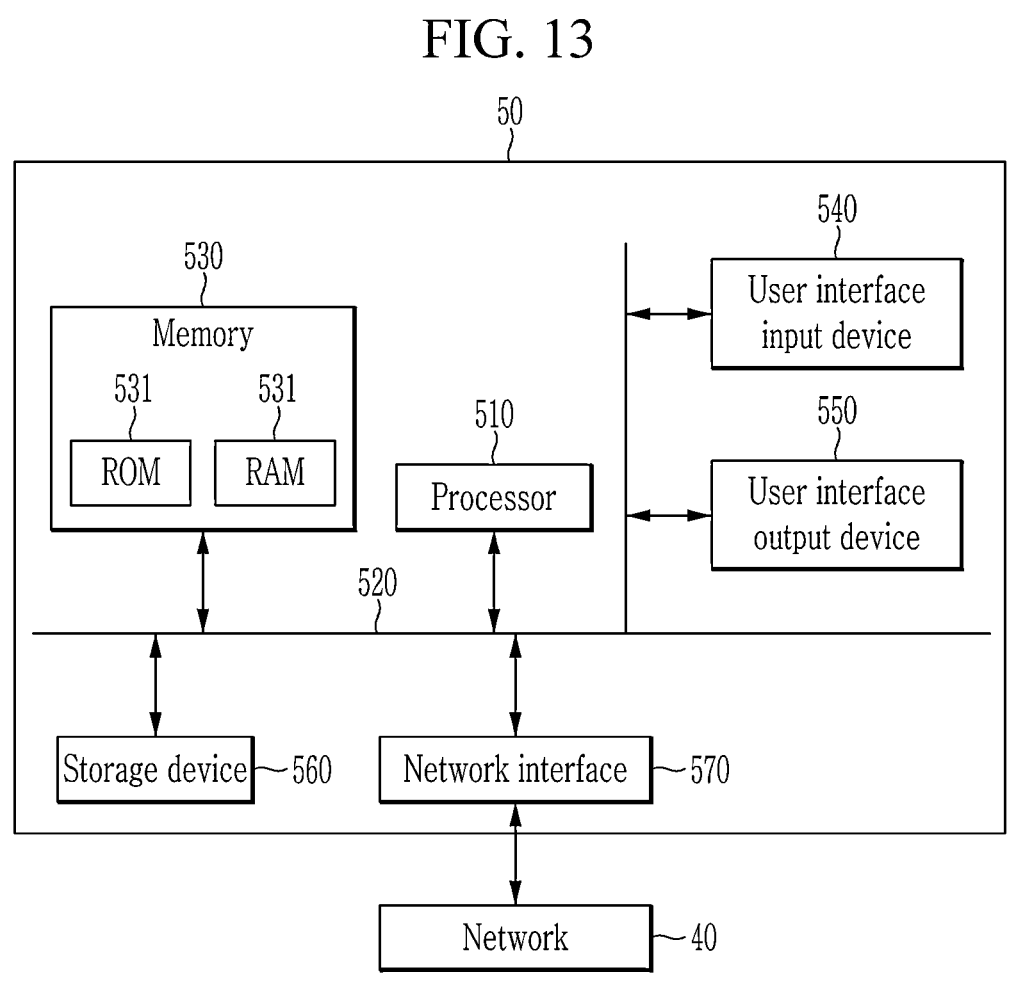

FIG. 13 is a diagram for describing a computing device according to an example embodiment.

Referring to FIG. 13, the device and the method for detecting the wildfire according to the example embodiments may be implemented by using the computing device 50.

The computing device 50 may include at least one of a processor 510, a memory 530, a user interface input device 540, a user interface output device 550, and a storage device 560 which communicate with each other through a bus 520. The computing device 50 may include a network interface 570 electrically connected to a network 40. The network interface 570 may transmit or receive a signal to or from another entity through the network 40.

The processor 510 may be implemented as various types including a micro controller unit (MCU), an application processor (AP), a central processing unit (CPU), a graphic processing unit (GPU), and a neural processing unit (NPU), and may be an arbitrary semiconductor device that executes an instruction stored in the memory 530 or the storage device 560. The processor 510 may be configured to implement the functions and methods in relation to FIGS. 1 to 12.

The memory 530 and the storage device 560 may be various types of volatile or non-volatile storage media. For example, the memory may include a read only memory (ROM) 531 and a random access memory (RAM) 532. In the example embodiment, the memory 530 may be positioned inside or outside the processor 510 and connected with the processor 510 by various well-known means.

In some example embodiments, at least some components or functions of the device and the method for detecting the wildfire according to the example embodiments may be implemented as a program or software executed by the computing device 50 or the program or software may be stored in a computer readable medium.

In some example embodiments, at least some components or functions of the device and the method for detecting the wildfire according to the example embodiments may be implemented by using hardware or a circuit of the computing device 50, or also implemented as a separate hardware or circuit which may be electrically connected to the computing device 50.

According to the example embodiments described up to now, a convolution computation is performed by considering offset information computed for a position of a pixel corresponding to a smoke by using a deformable convolutional network to enhance performance of smoke detection, and by setting a sample which is not clearly determined as the smoke to an ignore sample instead of setting the corresponding sample to a negative sample, the sample is prevented from being reflected on learning of a deep learning model to enhance wildfire detection performance.

While this invention has been described in connection with what is presently considered to be practical example embodiments, it is to be understood that the invention is not limited to the disclosed example embodiments. On the contrary, it is intended to cover various modifications and equivalent arrangements included within the spirit and scope of the appended claims.

What is claimed is:

1. A device for detecting a wildfire, the device comprising:

an image data acquisition module acquiring image data captured by a shooting device;

an image data storage module storing the image data acquired through the image data acquisition module in a storage space;

a wildfire detection module performing wildfire detection by using a deformable convolution based deep learning model to which smoke characteristics are reflected by dynamically adjusting a filter position by using a learnable offset from the image data; and a wildfire direction and position estimation module estimating a direction and a position of the wildfire with respect to a case where it is determined that the wildfire occurs by the wildfire detection module, wherein the wildfire detection module is configured to:

extract a feature map from the image data by using a backbone, extract the smoke characteristics by using the deformable convolution, integrate the feature map by using a feature pyramid network (FPN), estimate the position and a size of the wildfire based on the integrated feature map, improve a wildfire area learned by the deep learning model by using adaptive training sample selection (ATSS), and train the deep learning model for minimizing loss.

2. The device for detecting a wildfire of claim 1, wherein:

the wildfire detection module regards sample points arrayed inside a ground truth (GT) given as a bounding box on an image as a candidate group for a positive sample, computes a score for each sample point, and classifies each sample point in which the computed score is equal to or more than a predetermined threshold into the positive sample.

3. The device for detecting a wildfire of claim 2, wherein:

the wildfire detection module, classifies each sample point in which the computed score does not reach the predetermined threshold into an ignore sample.

4. The device for detecting a wildfire of claim 3, wherein:

the score is computed as intersection over union (IoU).

5. The device for detecting a wildfire of claim 3, wherein:

the score is computed as a product of an intersection over union (IoU) and a confidence of the deep learning model.

6. The device for detecting a wildfire of claim 1, further comprising:

an application programming interface (API) providing module providing an interface for enabling a user having an authority to easily use result data of performing wildfire detection and result of data of estimating the direction and the position of the wildfire.

7. A method for detecting a wildfire, the method comprising:

acquiring image data captured by a shooting device;

performing wildfire detection by using a deformable convolution based deep learning model to which smoke characteristics are reflected by dynamically adjusting a filter position by using a learnable offset from the image data; and estimating a direction and a position of the wildfire with respect to a case where it is determined that the wildfire occurs according to a wildfire detection result, wherein the performing wildfire detection comprises:

extracting a feature map from the image data by using a backbone;

extracting the smoke characteristics by using the deformable convolution;

integrating the feature map by using a feature pyramid network (FPN);

estimating the position and a size of the wildfire based on the integrated feature map;

improving a wildfire area learned by the deep learning model by using adaptive training sample selection (ATSS); and training the deep learning model for minimizing loss.

8. The method of claim 7, wherein:

the performing of the wildfire detection includes, regarding sample points arrayed inside a ground truth (GT) given as a bounding box on an image as a candidate group for a positive sample, computing a score for each sample point, and classifying each sample point in which the computed score is equal to or more than a predetermined threshold into the positive sample.

9. The method of claim 8, wherein:

the performing of the wildfire detection further includes, classifying each sample point in which the computed score does not reach the predetermined threshold into an ignore sample.

10. The method of claim 9, wherein:

the score is computed as intersection over union (IoU).

11. The method of claim 9, wherein:

the score is computed as a product of an intersection over union (IoU) and a confidence of the deep learning model.

12. The method of claim 7, further comprising:

providing an interface for enabling a user having an authority to easily use result data of performing wildfire detection and result of data of estimating the direction and the position of the wildfire.

13. A non-transitory computer-readable medium having a program recorded therein, wherein the program, when executed by a computer including a processor executing a program or an instruction stored in a memory or a storage device, causes the computer to execute:

acquiring image data captured by a shooting device;

performing wildfire detection by using a deformable convolution based deep learning model to which smoke characteristics are reflected by dynamically adjusting a filter position by using a learnable offset from the image data; and estimating a direction and a position of the wildfire with respect to a case where it is determined that the wildfire occurs according to a wildfire detection result, wherein the performing wildfire detection comprises:

extracting a feature map from the image data by using a backbone;

extracting the smoke characteristics by using the deformable convolution;

integrating the feature map by using a feature pyramid network (FPN);

estimating the position and a size of the wildfire based on the integrated feature map;

improving a wildfire area learned by the deep learning model by using adaptive training sample selection (ATSS); and training the deep learning model for minimizing loss.

* * * * *